US012586438B2

(12) United States Patent
Isaacs et al.

(10) Patent No.: US 12,586,438 B2
(45) Date of Patent: Mar. 24, 2026

(54) LIGHTED GAMING TABLE

(71) Applicant: LAS VEGAS SANDS CORP., Las Vegas, NV (US)

(72) Inventors: Dean Isaacs, Las Vegas, NV (US); Jack Williams, Las Vegas, NV (US); Andrew Costello, Las Vegas, NV (US)

(73) Assignee: LAS VEGAS SANDS CORP., Las Vegas, NV (US)

( * ) Notice: Subject to any disclaimer, the term of this patent is extended or adjusted under 35 U.S.C. 154(b) by 279 days.

(21) Appl. No.: 18/482,768

(22) Filed: Oct. 6, 2023

(65) Prior Publication Data

US 2025/0118146 A1 Apr. 10, 2025

(51) Int. Cl.
*G07F 17/32* (2006.01)

(52) U.S. Cl.
CPC ........ *G07F 17/322* (2013.01); *G07F 17/3293* (2013.01)

(58) Field of Classification Search
None
See application file for complete search history.

(56) References Cited

U.S. PATENT DOCUMENTS 7,367,884 B2 * 5/2008 Breeding ................ G07F 17/32 273/274
10,147,279 B2 12/2018 Chun
2004/0009799 A1 * 1/2004 Breeding ............ A63F 3/00157 273/309
2009/0291762 A1 11/2009 Walker
2022/0180708 A1 6/2022 Piorno
2024/0395102 A1 * 11/2024 Thompson ............. H05B 45/30

FOREIGN PATENT DOCUMENTS

TW 201026361 A 7/2010

OTHER PUBLICATIONS

International Search Report and Written Opinion for Application No. PCT/US2024/050031, mailed Jan. 3, 2025, 14 pages.

* cited by examiner

*Primary Examiner* — Ronald Laneau
(74) *Attorney, Agent, or Firm* — Womble Bond Dickinson (US) LLP

(57) ABSTRACT

A gaming table system is provided including a gaming table having a table top having at least one table top opening, at least one light emitting device located within the table top opening, a light geometry plate corresponding to the at least one light emitting device, wherein the light geometry plate has a light geometry plate opening to dictate a shape of light projected through the light geometry plate opening, a transparent material covering the at least one light emitting device and the light geometry plate, and a top surface material covering the table top opening and the light geometry plate, wherein light from the light emitting device can be projected on the top surface material in shape dictated by the light geometry plate.

20 Claims, 14 Drawing Sheets

LIGHTED GAMING TABLE

FIELD

Embodiments of the present disclosure relate to a gaming table.

BACKGROUND

Recently, the popularity of "live dealer games" has grown tremendously with the explosion of online casinos. "Live dealer games" refer to games in which players participate in a table game featuring a "live dealer" (i.e., a physical human being who deals playing cards or otherwise operates physical gaming equipment rather than a random number generator as the dealer). The live game action may occur at a physical table, but the players may play from a location remote from the table, and may still be at the casino or may be remote from the casino.

A live dealer game may be available for a variety of live casino games, such as, for example, poker, baccarat, roulette, craps, blackjack, among others. The remote player may receive game data from, for example, a game server, such as what cards have been dealt by a live dealer, and also transmits information to the game server, for example, which wagers have been made or cards played by the remote player. Additionally, the information communicated to the remote player from the game server may include a live video feed of the dealer and game-play at the gaming table, and also an indication of game data generated, such as a rank and suit of each dealt card, the result of a roulette wheel spin, the value of a dice thrown, among others.

SUMMARY

A gaming table system is provided including a gaming table having a table top having at least one table top opening, at least one light emitting device located within the table top opening, a light geometry plate corresponding to the at least one light emitting device, wherein the light geometry plate has a light geometry plate opening to dictate a shape of light projected through the light geometry plate opening, a transparent material covering the at least one light emitting device and the light geometry plate, and a top surface material covering the table top opening and the light geometry plate, wherein light from the light emitting device can be projected on the top surface material in shape dictated by the light geometry plate.

In one embodiment, the light geometry plate opening has an L-shape.

In embodiments, the gaming table system may also include a table top foam having a table top foam opening substantially aligned with the table top opening, wherein the light geometry plate is accommodated by the table top foam opening and a rail extending around at least a partial perimeter of the gaming table and protruding above the table top, wherein the rail accommodates at least one of or both of an upper rail lighting configured to illuminate a dealer located adjacent to the table and a lower rail lighting configured to provide dealing information to the dealer.

In embodiments, the upper rail lighting includes a continuous strip of lighting and the lower rail lighting includes multiple individually controllable light emitting devices.

In embodiments, the gaming table system may also include an overhead camera system that is configured to capture footage of gaming activity at the gaming table, wherein the overhead camera system is configured to analyze whether cards on the gaming table are in a correct location and orientation and a card shoe, wherein the card shoe comprises a detector to determine card information of a card extracted from the card shoe and communicate the card information to the overhead camera system.

In one embodiment, the top surface material is substantially opaque, but wherein light from the visual indicator projected onto a first side of the top surface material is visible on a second opposite side of the top surface material.

In one embodiment, a gaming table system includes a gaming table having a table top surface on which a card game can be played, a visual indicator providing a visual guide as to where a playing card should be placed, the visual indicator comprising a light emitting device and configured to display a light-based shape on the table top surface when the light emitted device emits light, a camera configured to capture footage of the table top surface, and a dealer display device in communication with the camera and configured to provide an indication when the playing card is placed in a correct location.

In one embodiment, the visual indicator is covered by the table top surface such that the light-based shape is projected onto the table top surface from a side opposite to a surface on which the card game can be played, for example, the light-based shape may be projected onto the table top surface from below the table top surface.

In one embodiment, the visual indicator is covered by the table top surface such that the visual indicator is not visible through the table top surface.

In one embodiment, the gaming table system includes a card show, wherein the camera is configured to compare card data from the card shoe to footage of the card dealt and communicate comparison data with the dealer display device. In one embodiment, the card data comprises at least one of a card location, a card orientation, a card suit, and a card rank.

DETAILED DESCRIPTION

Figure 1:
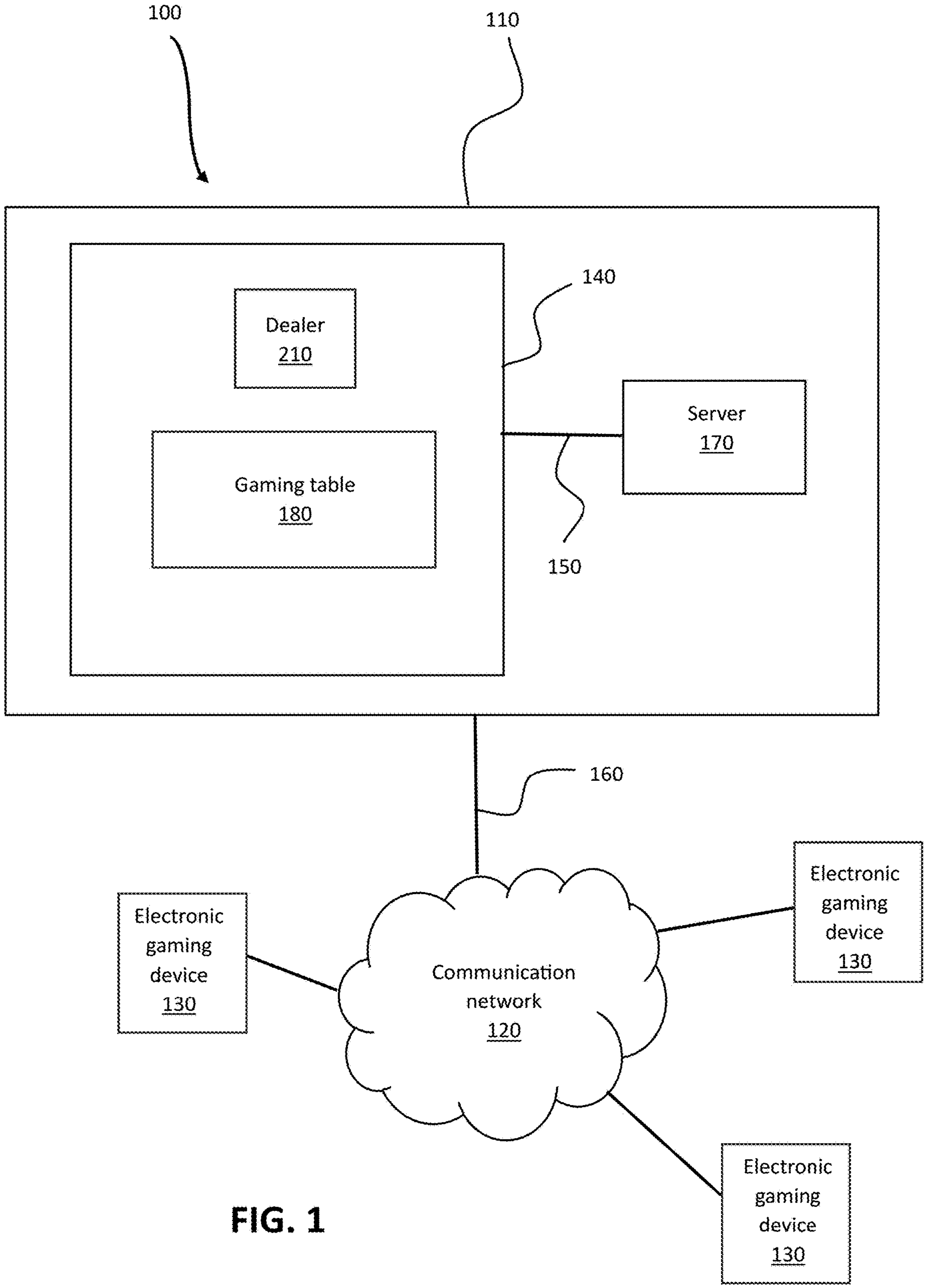
FIG. 1 is a schematic view of an embodiment of the gaming table system.

In the following detailed description of illustrative embodiments, reference is made to the accompanying figures of the drawing which form a part hereof, and in which are shown, by way of illustration, specific embodiments which may be practiced. It is to be understood that other embodiments may be used and structural changes may be made without departing from the scope of the disclosure presented herein.

Exemplary systems and methods shall be described with reference to FIGS. 1-19. It will be apparent to one skilled in the art that elements or processes from one embodiment may be used in combination with elements or processes of the other embodiments, and that the possible embodiments of such methods and systems using combinations of features set forth herein is not limited to the specific embodiments shown in the Figures and/or described herein. Further, it will be recognized that the embodiments described herein may include many elements that are not necessarily shown to scale.

In embodiments as described in more detail below, a gaming table has a number of lighting features that improve the gaming experience for the dealer and for the player. In one embodiment, the gaming table has lights located under a top surface of the table (e.g., a felt coving a table top) that provide a visual guide to the dealer for locations on the table on which to place and align the cards so that players can see their cards on their computer or phone screen. As will be appreciated, there can be a number of different configurations for the lights depending on the nature of the game. In another embodiment, the table has lights on an upper portion of a rail or other edge portion of the gaming table, wherein the lights are directed towards the live dealer to more clearly illuminate the dealer for the users playing remotely. In yet another embodiment, the gaming table may have lights on a lower portion of the rail to provide an indication to the live dealer as to when to (and when not to) deal a card and, in some case, provide directional assistance as to where to deal a card, for example, to the left side or right side of the table.

With reference now to FIG. 1, a gaming table system 100 is illustrated that allows a remotely located user to engage in a live dealer game. As shown, the system 100 includes a live play gaming space 110 (for example, a casino or a studio configured to house a game), a communication network 120, and at least one electronic gaming device 130 (e.g., a gaming terminal, a mobile phone, a computer or any other electronic device configured to allow game play) by which a remote player can play the game. The live play gaming space 110 may include a gaming area 140, where a dealer and any live players are located, communication links 150, 160, and a server 170. The gaming area 140 may be, for example, located in a casino having at least one table 180 for playing the game or in a studio having at least one table for playing the game.

The electronic gaming device 130 allows a user to view and interact with the live play gaming space 110 via, for example, a display screen for viewing a live feed of game-play at the live play gaming space. In addition, the electronic gaming device 130 may be configured to allow user input and to transmit such user input to the server 170 via an interface.

The communication link 150 connects an input device, such as a camera, located at the gaming area 140 with the server 170 to provide a live feed to the user operating the electronic gaming device 130. In one embodiment, the communication link 150 may be arranged as a plurality of communication links such as a local area network coupled to a wireless network. It will be appreciated, however, that there are many different configurations of communication links that could be used in association with the present system 100.

In embodiments, the server 170 may be operated by a gaming operator running the live dealer game or by an entity that is not directly associated with the game. The server 170 may include a number of electronic communication systems that may communicate with one or more devices in the live play gaming space 110 and with one or more electronic gaming devices 130 operated by users. For example, the server 170 may be configured to receive gaming data from the electronic gaming device 130, such as an indication of the rank and suit of cards played, any bets wagered, any game options available to the users or to the dealer, among others. Further, the server 170 may be arranged to communicate with entities not depicted in FIG. 1, such as other gaming devices, a web server, or administrative facilities.

The server 170 may be arranged in a variety of configurations and may include a communication interface, a processor, and data storage all linked together via, for example, a system bus. Accordingly, the server 170 may execute computer-readable program instructions stored in data storage to enable a plurality of electronic gaming devices to each play one or more live dealer games, to determine the outcome of game-play decisions and game results at a live dealer game, to transmit the game results to one or more electronic gaming devices, to operate in conjunction with a larger online gaming system (e.g., a separate gaming server, an online casino website, or a web server), or to manage a remote player's credit account, for example.

Figure 2:
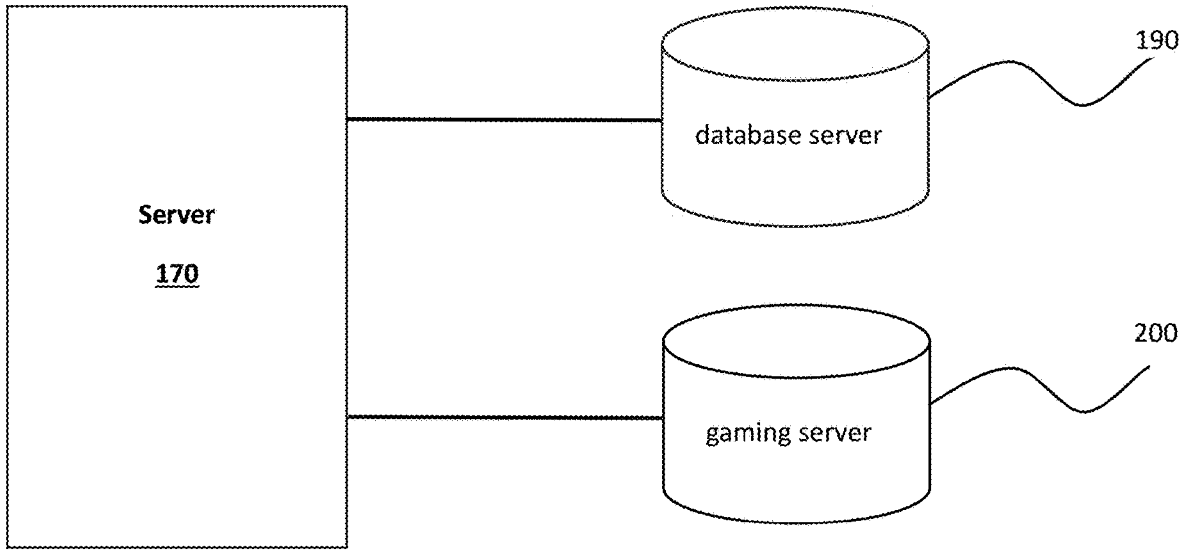
FIG. 2 is a schematic view of an embodiment of a server of the gaming table system of FIG. 1

The server 170 may include discrete servers or may be an integrated server. The server 170, or each discrete server that makes up the server 170 may reside locally in or remotely from the live play gaming space 110. With reference to FIG. 2, a block diagram illustrates an exemplary server 170 including ancillary servers that may be used to operate the live dealer game in the system of FIG. 1. As shown, the server 170 may include a database server 190 and a gaming server 200. It will be appreciated that each server may perform separate functions. In one embodiment, the database server 190 may store game-related information and data, for example, the rank and suit of cards displayed, the amounts wagered, among others.

Further, the gaming server 200 may generate data for transmission to the users, handle user registration, and act as a credit facility. The gaming server 200 may be, for example, a central gaming server, a peer-to-peer network, a distributed network, or the like. The gaming server 200 may determine the outcome of game-play decisions and game results at the live dealer game and transmit the results to a user playing the game on an electronic gaming device 130 via the communication network 120 and to any other participating remote players at corresponding electronic gaming devices via the communication network 120.

The gaming server 200 may be part of a more elaborate online gaming system which, in addition to the gaming server also includes an online casino website hosted on a casino web server. In one embodiment, the online casino website may be accessible by each user through an electronic gaming device 130 via the communication network 120.

In one embodiment, the gaming server 200 may also include a database having user credit accounts to allow users to deposit and withdraw funds and which maintains a user's balance when the user places wagers in the live dealer game.

The communication network 120 couples the live play gaming space 110 and the server 170 to an electronic gaming device 130 via the communication link 160 and allows data communication between the server 170 and the electronic gaming device 130. In one embodiment, the communication network 120 may be the Internet or a telephone network.

Figure 3:
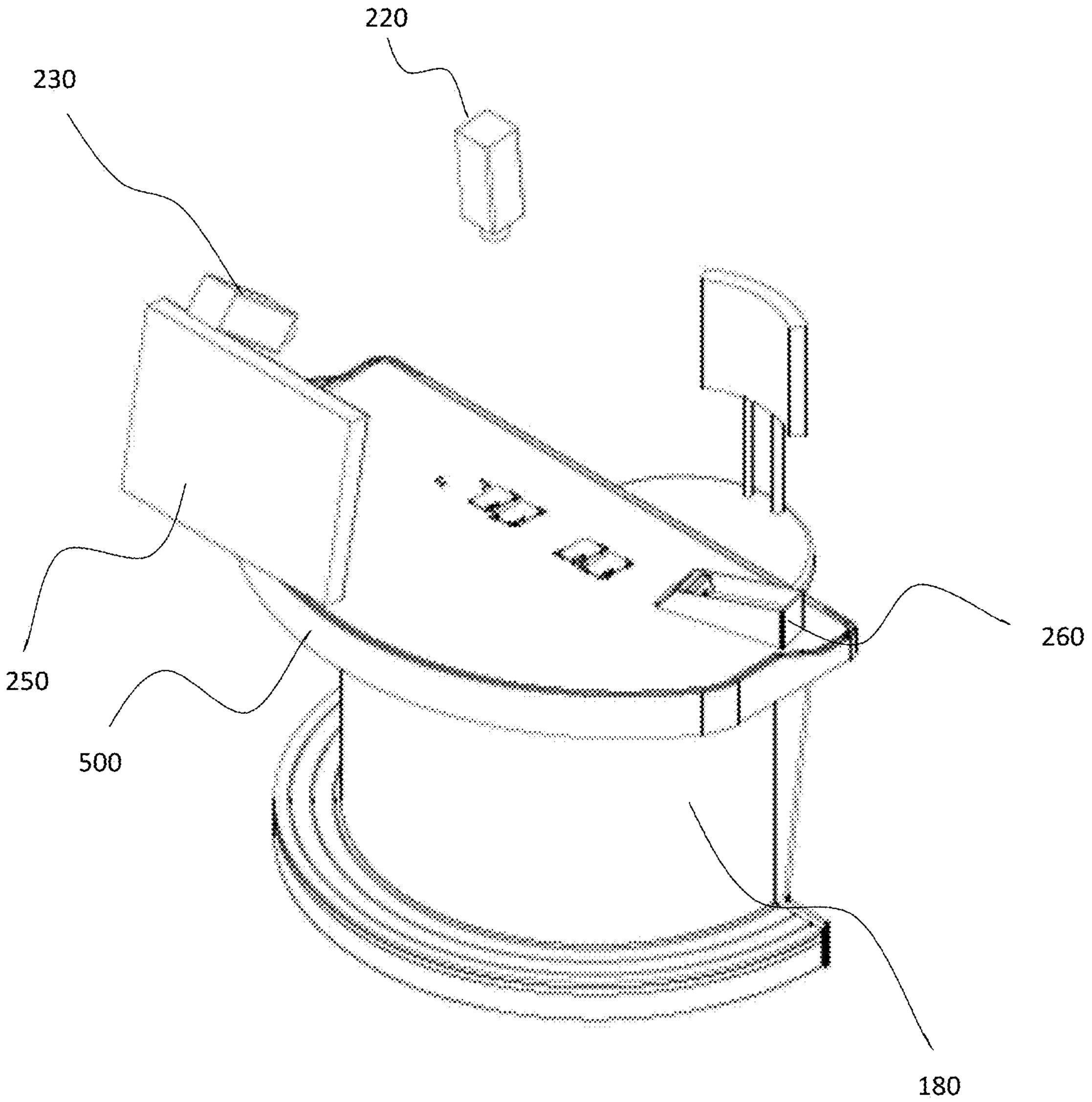
FIG. 3 is a perspective view of an embodiment of a live play gaming space of the gaming table system of claim 1.
Figure 4:
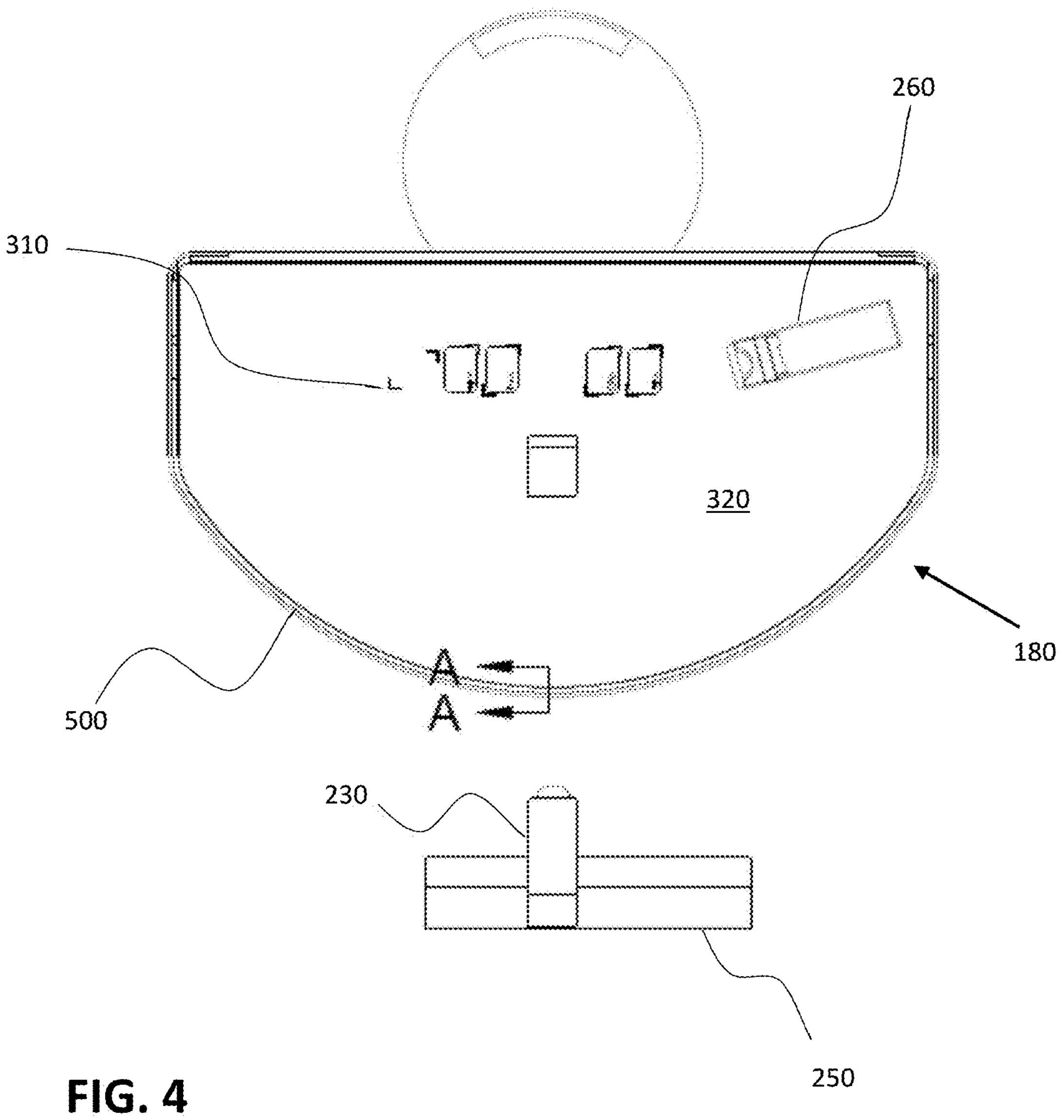
FIG. 4 is a plan view of an embodiment of a live play gaming space of the gaming table system of claim 1.

FIGS. 3 and 4 are an exemplary illustration of the live play gaming space 110 of the system 100 shown in FIG. 1. As shown, the live play gaming space 110 may include at least one gaming table 180 configured to accommodate an associated live dealer 210, input devices in the form of an overhead video camera 220 and a front-facing camera 230, a dealer display device 250, and a card shoe 260.

A live feed of gaming action occurring at the gaming table 180 may be captured by the overhead and front facing cameras 220, 230 associated with the gaming table, and the live feed may be transmitted to each electronic gaming device 130 of users participating in the game occurring at the table. Particularly, the overhead camera 220 may be used to show the rank and suit of cards on the table to the users when they are revealed by the live dealer 210 at the table as well as any other gaming-related action. The dealer display device 250 associated with the gaming table 180 may be used to communicate game play of users as well as other information as described below to the dealer 210.

Figure 5:
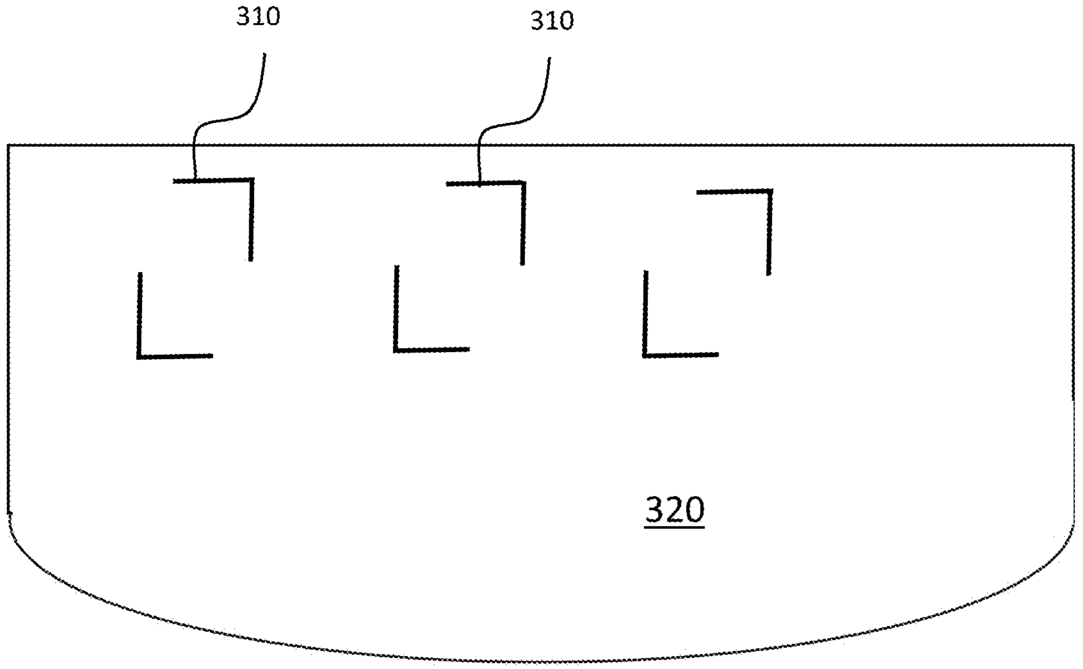
FIG. 5 is a plan view of an embodiment of a gaming table top surface of the gaming table system with visual indicators.

FIGS. 3-5 illustrate various aspects of an exemplary gaming table 180 for use with the live dealer game. Particularly, in one embodiment as shown in FIG. 5, the gaming table 180 includes visual indicators 310 visible on a gaming table surface 320 that provide visual cues and guides for card placement as well as timing cues to the live dealer 210 who is dealing the cards by placing them on the table surface. The visual indicators 310 may vary in terms of shape and size, as described in more detail below, and the visual indicators may be activated at different times to assist with the timing of the dealing of cards depending on the live dealer game that is being played at the gaming table 180.

In one embodiment, with continued reference to FIG. 5, the visual indicators 310 appear as L-shaped markers that are spaced from each other and aligned such that corners of playing cards 330 being dealt by the dealer 210 fit within opposing L-shaped visual indicators 310. Accordingly, the visual indicators provide a guide as to where the dealer should place the card such that users playing on their electronic gaming device 130 can see the card and, if relevant to the game being played, know whether it is their card, a community card, or another user's card, for example. As described in more detail below, the visual indicators 310 may be in the form of light emitted from a light source within the table and which is exposed on a top surface of the table, such as the table felt. It will be appreciated that the light sources may be controlled by a controller such that all of the light sources are on simultaneously, only some of the light sources are on simultaneously, or that the light sources are turned on and off sequentially during game play so as to provide a visual guide to the dealer 210 as to when and where to place the next card.

Figure 6:
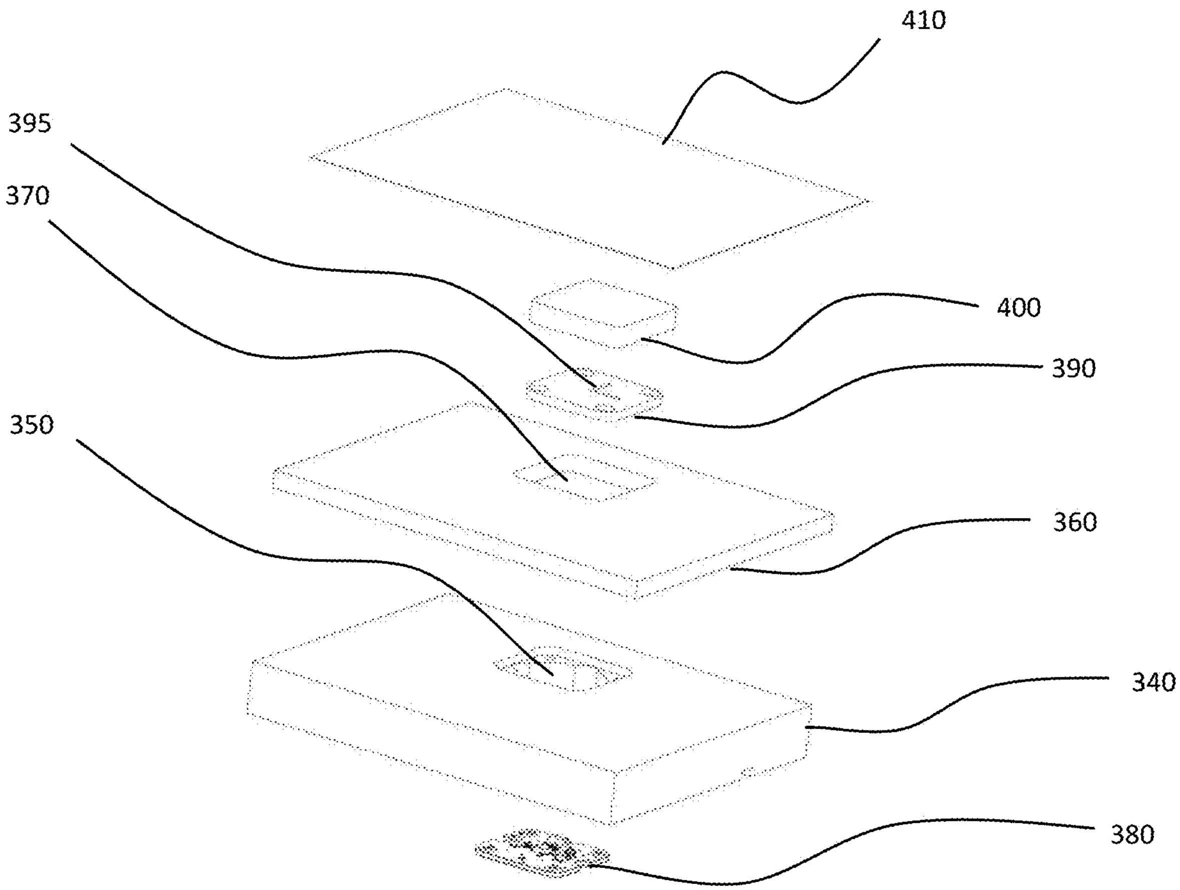
FIG. 6 is an exploded view of a visual indicator of the gaming table system of FIG. 1.
Figure 7:
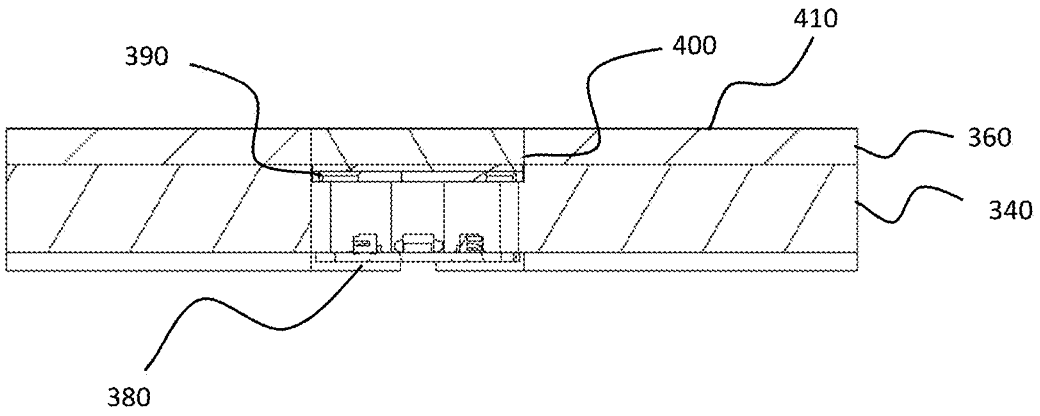
FIG. 7 is a cross-sectional view of a visual indicator of the gaming table system of FIG. 1.

With reference also to FIGS. 6 and 7, a structure of the gaming table 180 housing the visual indicators 310 is shown. Particularly, the gaming table 180 may include a table top 340 that includes openings 350 which are configured to each accommodate a light emitting device 380. As will be appreciated, the table top 340 may be made from, for example, wood, metal, or a synthetic material that provides a rigid surface to support game play. The gaming table system 180 may further include a table top foam 360 substantially or entirely covering the table top 340 which may provide a softer surface for player comfort and for ease of picking up cards from the gaming table 180. The table top foam 360 may also include openings 370 that substantially correspond to respective openings 350 in the table top 340.

In one embodiment, the light emitting device 380 may be located within the table top opening 350 and a visual indicator light geometry plate 390 may be located above (or otherwise in the path of) the light emitting device 380 such that light beamed through the light geometry plate appears in the shape dictated by the light geometry plate. As shown in FIG. 5, the light geometry plate 390 may have an opening 395 through which light may pass, in this case in an L-shape, and the light geometry plate may be configured to dictate such L-shape projected on the top surface material 410 to guide a dealer as to where a corner of a card should be placed. However, it will be appreciated that the light geometry plate 390 could dictate numerous other light shapes as well, such as dots, stars, a smiley face, a plus sign, or a rocket, for example.

Additionally, a piece of transparent or semi-transparent material 400, such as gel foam, may be located on top of the light geometry plate 390 to protect and seal the light emitting device 380 and the light geometry plate 390 within the openings 350, 370 while still allowing light emitted from the light emitting device 380 to be visible through the transparent or semi-transparent material. In one embodiment, the transparent material 400 may be attached to the table top foam 360 via an adhesive or an interference fit, but it will be appreciated that the transparent material may also be attached via other fasteners.

Further, a top surface material 410, such as felt, which forms the playing surface on the gaming table 180 may be used to cover the openings 350, 370, the transparent or semi-transparent material 400, the light emitting device 380, and the light geometry plate 390, wherein light emitted by the light emitting device 380 is visible through the top surface material. With reference again to FIG. 5, when the light emitting device 380 emits light, the light passes through the light geometry plate 390 and the transparent material 400 and appears on the top surface material 410 in the shape dictated by the light geometry plate.

Figure 8:
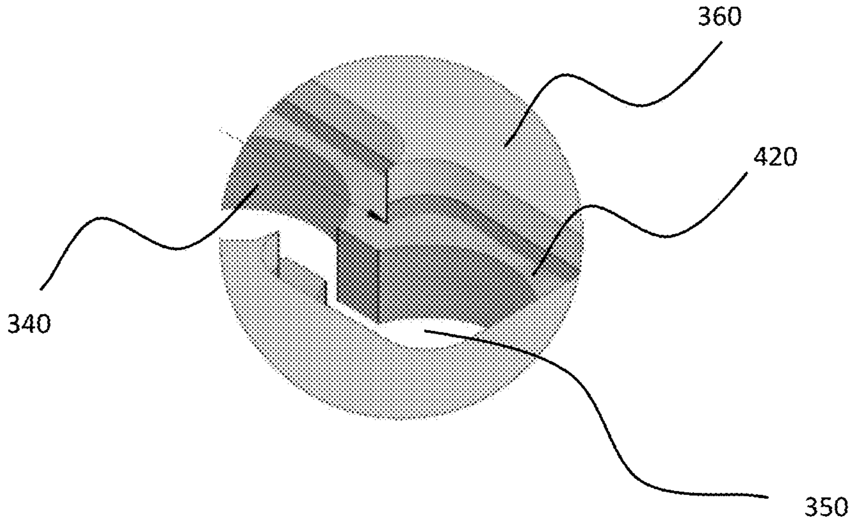
FIG. 8 is a perspective cut away view of a portion of a gaming table of the gaming table system of FIG. 1.
Figure 9:
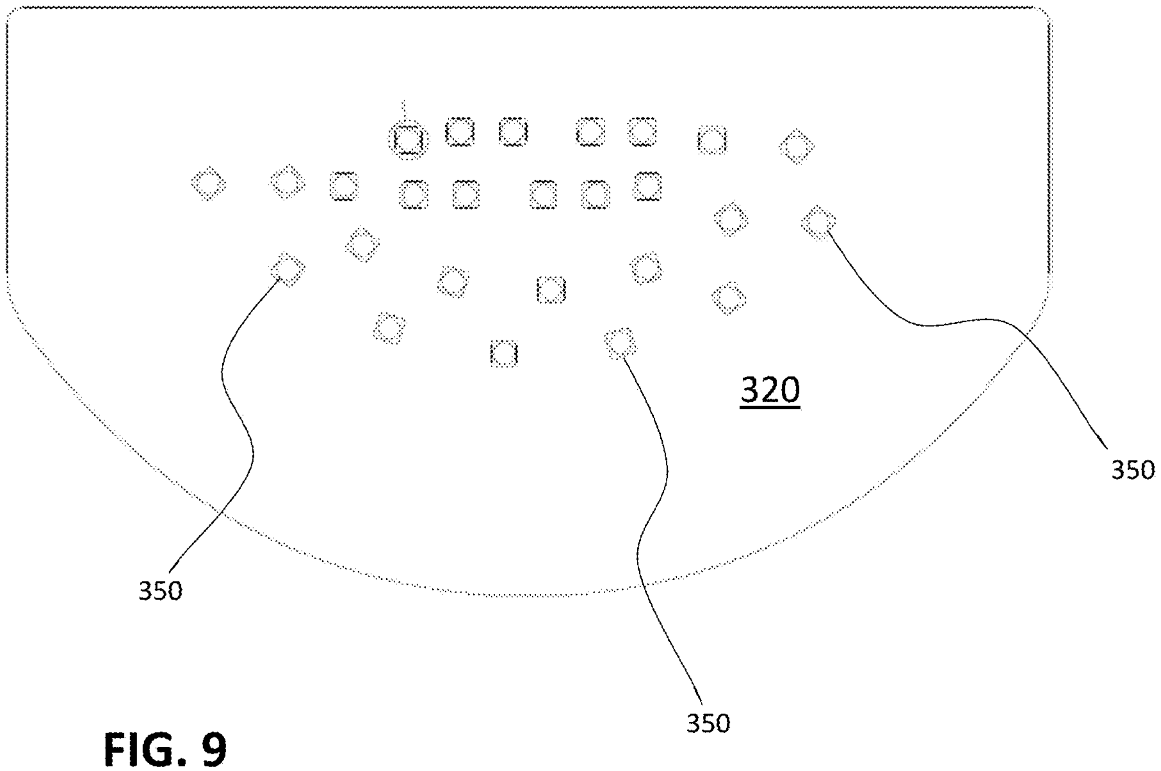
FIGS. 9 and 10 are top and bottom views of an embodiment of a table top of the gaming table system of FIG. 1.

With reference also to FIG. 8, the table top foam opening 370 may be larger than the table top opening 350 such that the table top 340 creates a ledge 420 on which the transparent material 400 may rest and may be attached to (such as with an adhesive or an interference fit). With reference also to FIG. 9, the table surface 320 may include numerous openings 350 such that a number of visual indicators can be shown on the table surface. As will be appreciated, there are many possible configurations and orientations for each of the visual indicators 310, of which one example is shown.

Figure 10:
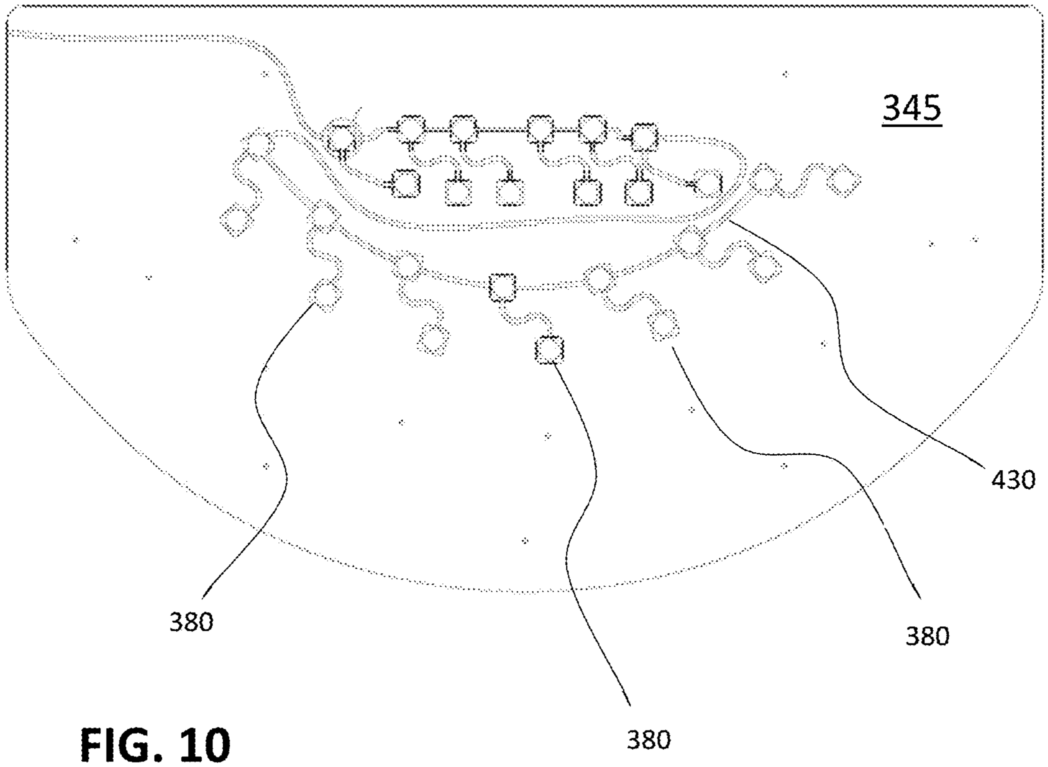

With reference to FIG. 10, each of the light emitting devices 380 may be electrically connected to each other via an electrical line 430 that may be connected to an electrical power supply to provide power to each of the light emitting devices. In one embodiment, the electrical line 430 may be secured to and extend along a bottom surface 345 of the table top 340. Further, each light emitting device 380 may be controlled individually by a controller such that it may be turned on or off as necessary during game play. In one example, the light emitting devices 380 may be turned on sequentially to turn on individual visual indicators 310 as the cards are dealt by the dealer 210 so as to provide a visual cue to the dealer as to where to deal the next card and in what orientation to place the card so that it is visible to user playing on their electronic gaming device 130.

Figure 11:
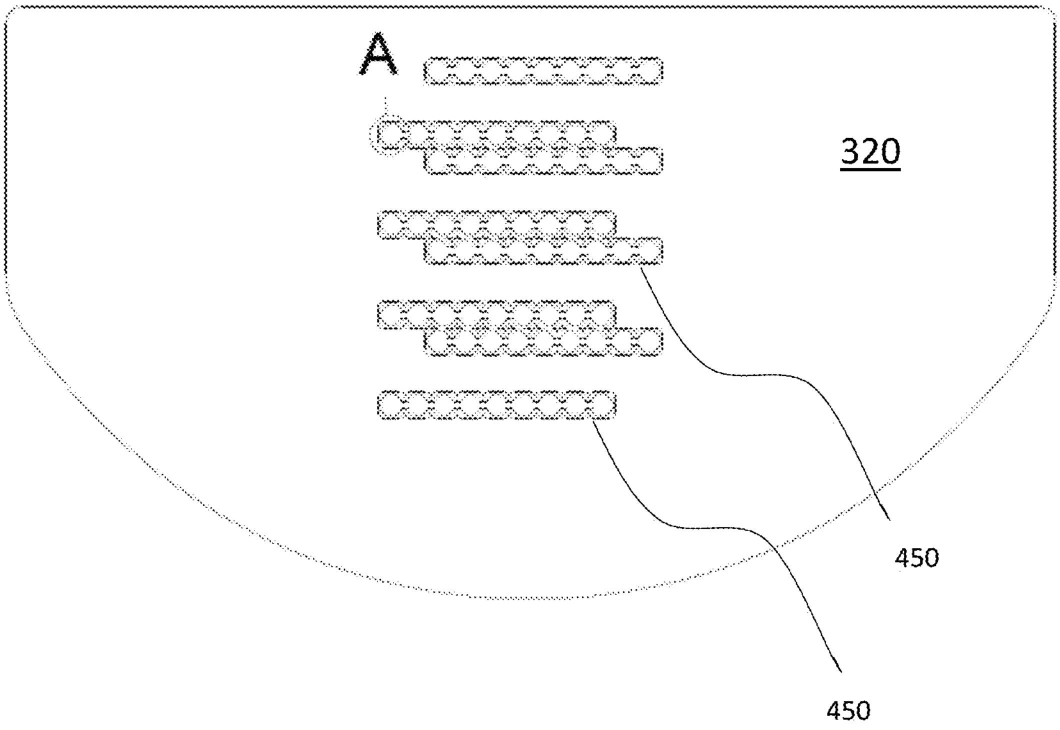
FIGS. 11 and 12 are top and bottom views of another embodiment of a table top of the gaming table system of FIG. 1.
Figure 12:
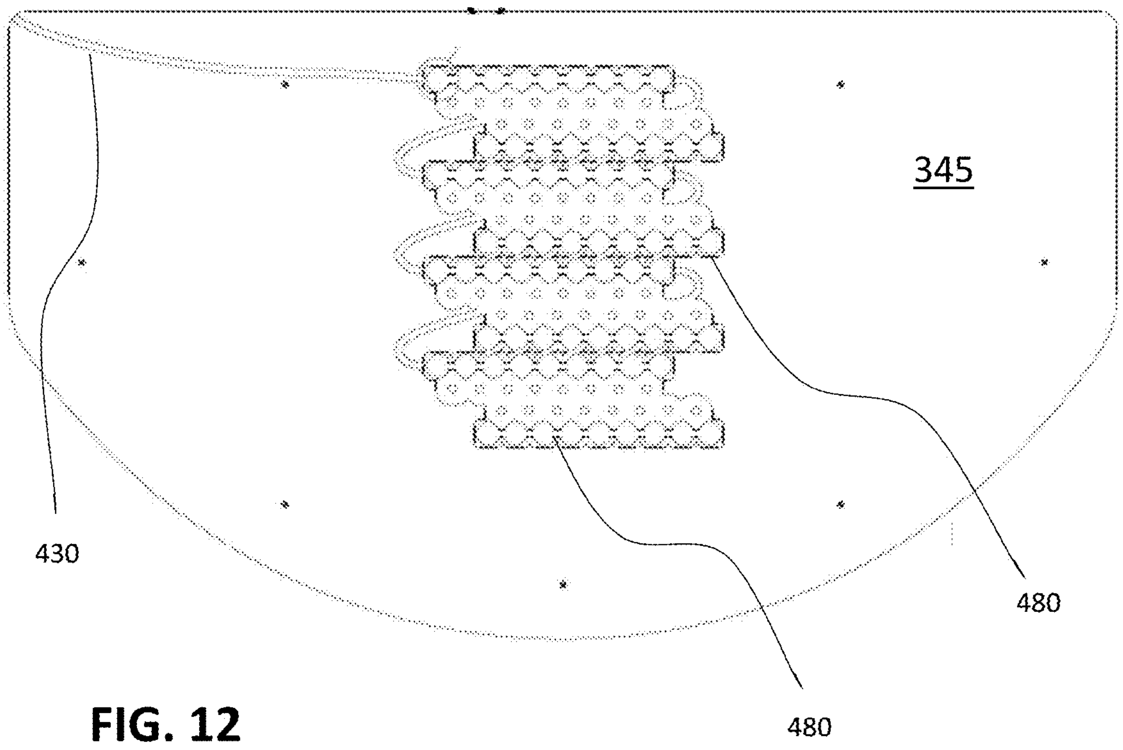
Figure 13:
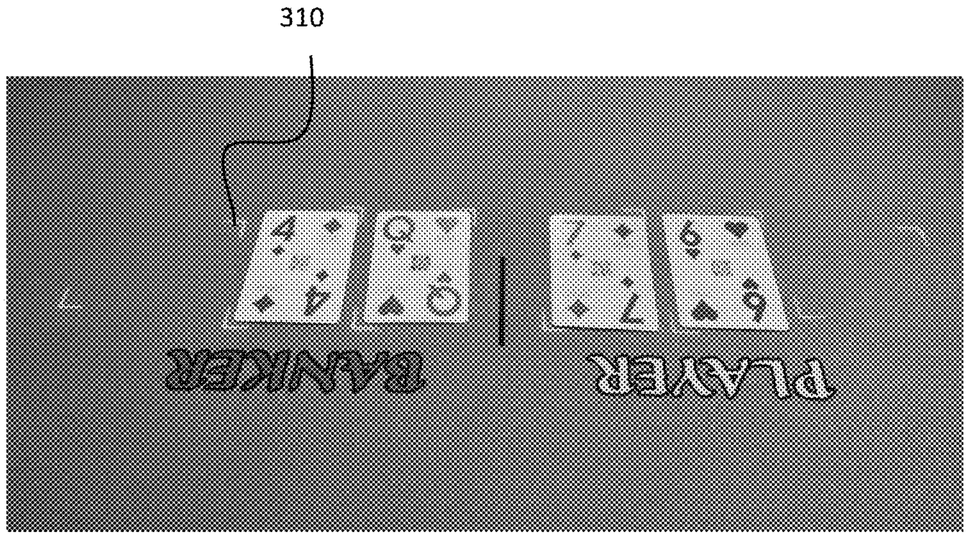
FIG. 13 is a top view of an embodiment of the top surface material and visual indicators along with playing cards placed in a correct position with respect to the visual indicators.
Figure 14:
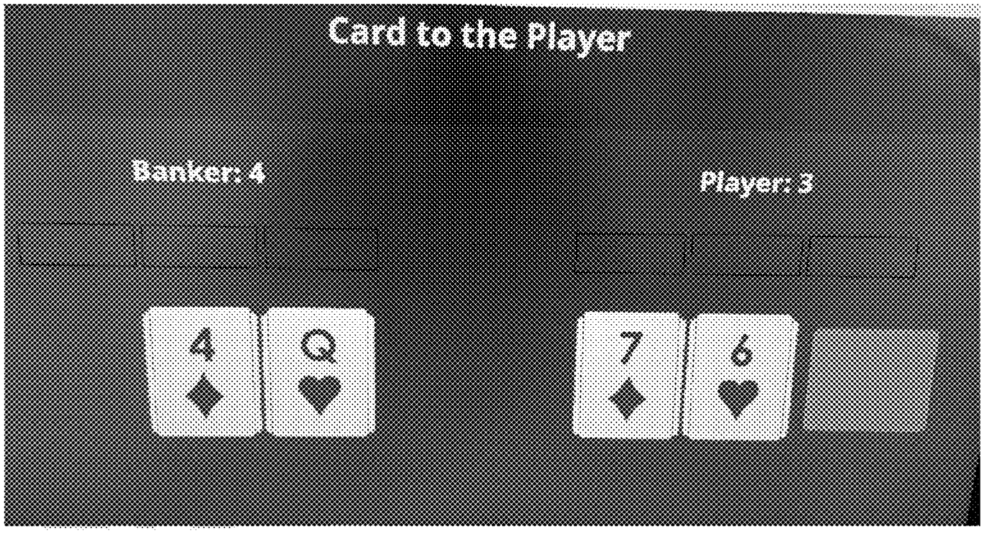
FIG. 14 is a view of a dealer display device screen indicating that the playing cards are correctly placed and indicating where the next card should be placed.
Figure 15:
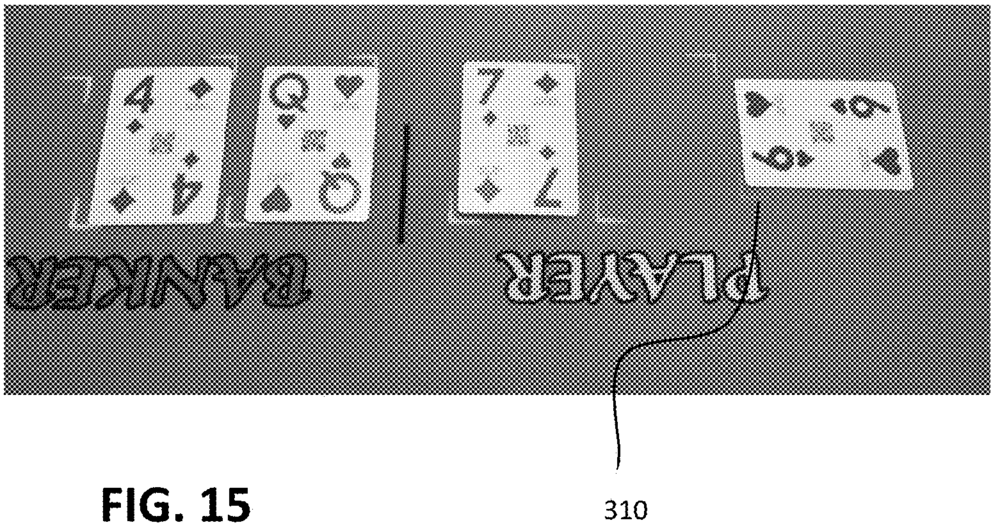
FIG. 15 is a top view of an embodiment of the top surface material and visual indicators along with playing cards placed in an incorrect position with respect to the visual indicators.
Figure 16:
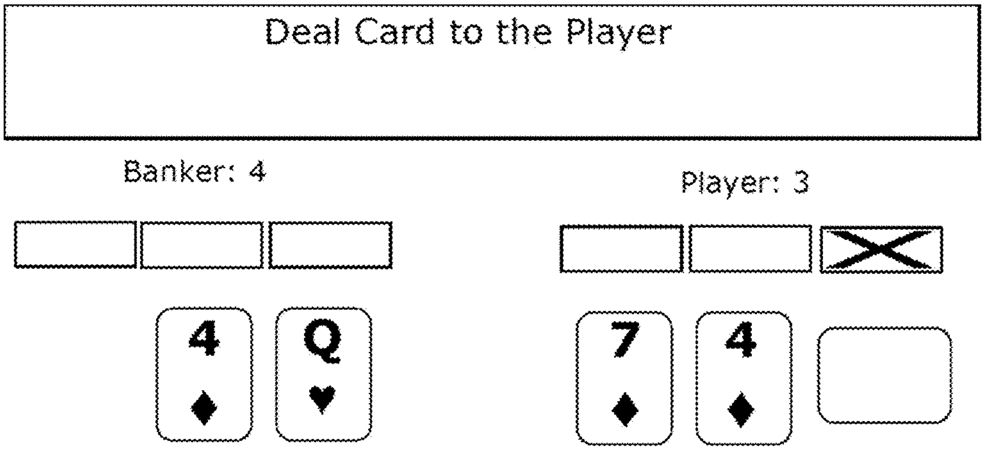
FIG. 16 is a view of a dealer display device screen indicating that at least one of the playing cards is incorrectly placed.

In another embodiment, as shown in FIGS. 11 and 12, a number of table top openings 450 and table top foam openings may be located adjacent to each other such that light from light emitting devices 480 located within such openings 450 is perceived as a continuous line (or lines) extending across the table surface. Further, similarly to the previous example, the light emitting devices 480 may be electrically connected to each other via an electrical line 430 and individually operable such that they can be sequentially or simultaneously activated.

With reference now to FIGS. 3 and 4 and also to FIGS. 13-16, the dealer 210 may use the visual indicators 310 in combination with information relayed to the dealer via the dealer display device 250 to ensure that dealt cards are in the proper location and orientation.

In one embodiment, the card shoe 260 may be configured to identify, for example, the rank and suit of a card when the card is removed from the card shoe, and thus may include an optical detector. If a card-based live dealer game is played, the optical detector of the card shoe 260 can capture an image of the face of a card as the card passes over the optical reader. In another embodiment, the card shoe 260 may include a bar code reader configured to read a face of each card that contains a unique bar code (or other unique marking) indicating the card's rank and suit, for example, or other relevant information. The bar code reader can then read the bar code on the card as the face of the card is passed over the reader by the live dealer 210. Once the card shoe 260 reads the card data, the card shoe may communicate the card data to the database server 190 which can store the card data. As will be appreciated, other devices may also be used to identify card data and communicate such data to the server 170.

The overhead camera 220 may be located to be able to capture all of the gaming activity occurring at the gaming table 180. For example, the camera 220 may be directed at the playing surface 270 of the gaming table 180 to detect activity occurring on the playing surface, particularly, the exposure of playing cards on the table. In one embodiment, the camera 220 is configured to record a live video feed of game-play at the gaming table 180 which may be transmitted over the communication network 120 shown in FIG. 1 to the user's electronic gaming device 130.

In one embodiment, software associated with the database server 190 can display the cards dealt from the card shoe 260 on the dealer display device 250, for example, as shown in FIGS. 13-16. Further, the overhead camera 220 is configured to capture footage of each card placed on the gaming table 180 by the dealer 210. As such, the software can compare the footage captured by the overhead camera 220 with the card data stored in the database server 190 to determine whether the card data captured by the camera matches the card data stored in the database server. Further, the software may be trained to be able to identify the correct location and orientation of the cards being dealt and if the location and orientation do not match the expected location and orientation, the software can provide an indication to the dealer 210 via the dealer display device 250 that the card is in the wrong location, the wrong orientation, or is not the correct rank and/or suit. For example, with reference to FIGS. 13 and 14, the software can indicate that the correct cards are on the table in the correct location and in the correct orientation by providing a colored rectangle, for example, a green rectangle, indicating to the dealer that all cards are correct and that the next card should be placed in a horizontal position next to the existing cards which are in a vertical position. Further, the display may indicate, for example, by a check mark or other indicator (or a lack of an indicator), that all of the cards are correctly positioned on the table. On the other hand, with the respect to FIGS. 15 and 16, the display may indicate that one of the cards is in an incorrect location or position or of the wrong suit or rank by showing an "X", a red rectangle, or any other appropriate indicator by which the dealer can identify that there is a misplaced card.

As part of the user experience playing a live dealer game, the system 100 may allow the user to see the dealer 210 on the display of their electronic gaming device 130 via the use of the front facing camera 230 (see, e.g., FIGS. 3 and 4) which captures footage of the dealer 210 and the dealer's actions. As such, the user can have a more realistic game playing experience by seeing a human being rather than a robot, cartoon, or other inanimate dealer character.

Figure 17:
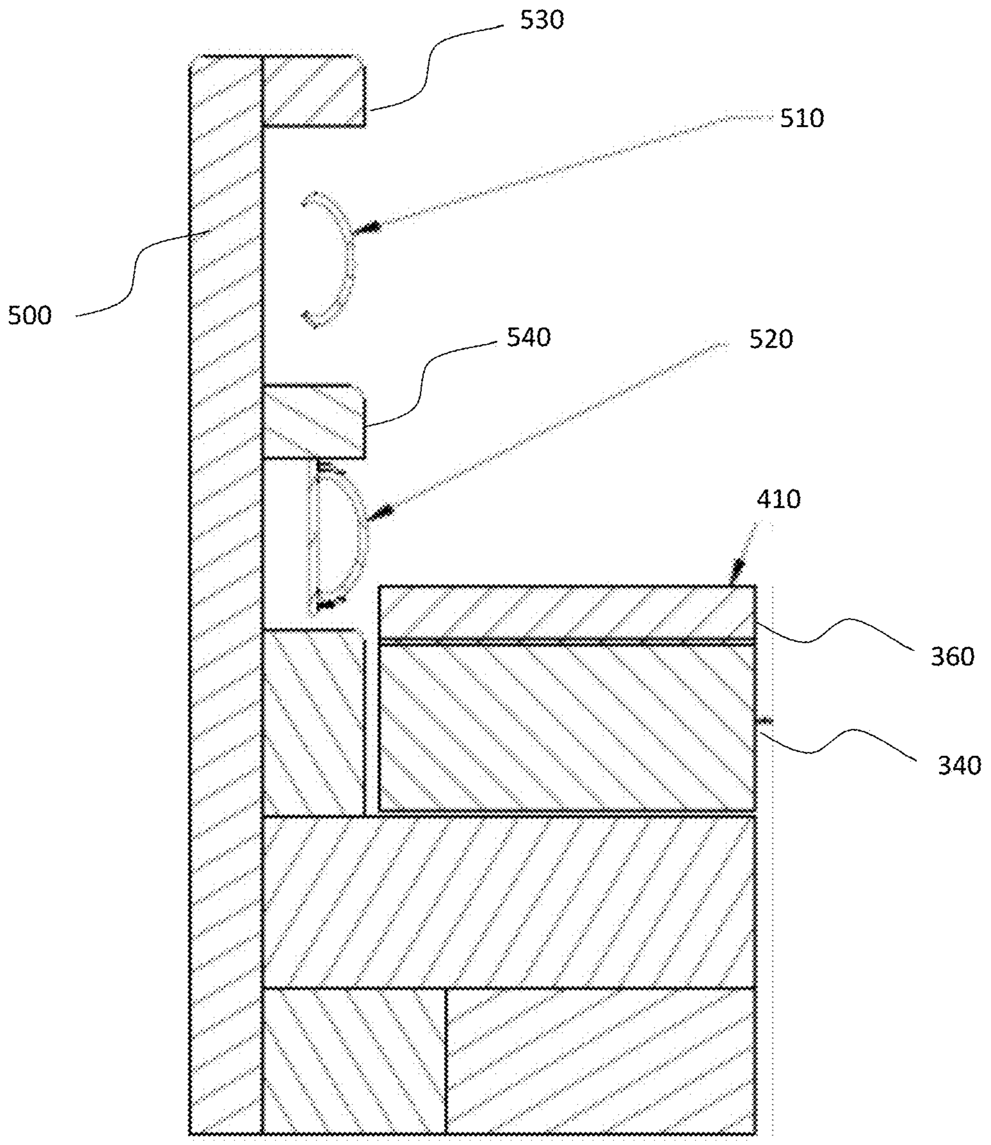
FIG. 17 is a cross-sectional view of an embodiment of a gaming table taken along the section A-A of FIG. 4
Figure 18:
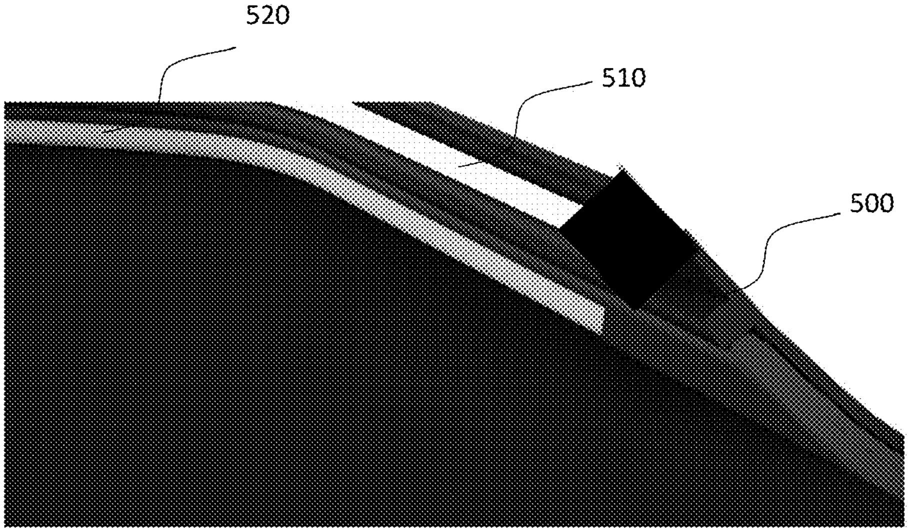
FIG. 18 is a detail view of an embodiment of a rail including upper and lower rail lighting of the gaming table system of FIG. 1.

With reference to FIGS. 3, 17 and 18, the gaming table 180 includes a rail 500 which may protrude above the table top surface material 410 (e.g., above the table felt) and extend around a partial or entire outer perimeter of the table. In one embodiment, as shown in FIG. 3, the rail may extend around edges of the gaming table 180 that are not adjacent to the dealer, i.e., around the sides and far edge of the gaming table. It will be appreciated, however, that the rail 500 may extend entire around the gaming table 180 or may extend around a lesser portion of the table than shown herein. Further, in one embodiment, the rail may have a height configured to accommodate table lighting for various purposes as described below. In one embodiment, a height of the rail 500 may be about six to twelve inches, although it will be appreciated that the precise height of the rail is not critical.

In order to maximize the user's experience, to obtain the best visualization of the dealer through the front facing camera 230, and to potentially eliminate at least some non-table equipped lighting in the live play gaming space 110, the gaming table 180 may include upper rail lighting 510, or subject lighting, that serves to illuminate the dealer 210 to provide an improved visual image of the dealer on the user's electronic gaming device 130. In one embodiment, the upper rail lighting 510 may include a light emitting diode strip that is attached to and extends continuously along an upper portion of the rail 500. When the upper rail lighting 510 is turned on via a controller (such as the dealer display device 250), it is able to illuminate the dealer 210 located opposite to the upper rail lighting. Further, because the upper rail lighting 510 is located against the inside of the rail 500, light from the upper rail lighting is directed towards the dealer. In one embodiment, the rail 500 may also include an upper lip 530 and a lower lip 540 which further assist in directing the light towards the dealer 210. Accordingly, the system 100 may allow bright and hot studio lights often located in a live play gaming space and used to illuminate the dealer to be omitted or reduced, thereby increasing a dealer's comfort and making the dealing experience more enjoyable.

Figure 19:
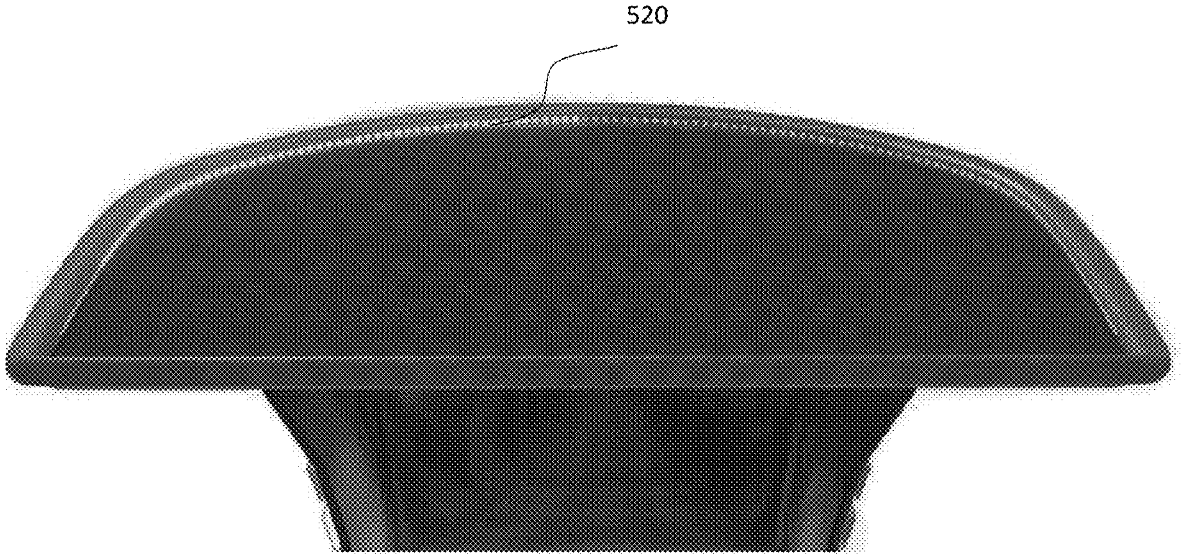
FIG. 19 is a perspective view of an embodiment of a gaming table with a section of lower rail lighting illuminated.

With further reference to FIGS. 17-19, the gaming table 180 also may include lower rail lighting 520 which may extend along a lower portion of the rail 500 between the top surface material 410 and the lower lip 540 of the rail. The lower rail lighting 520 may include a diffused multi-colored light emitting diode strip extending along at least a portion of the rail and wherein the lights are not substantially visible to the overhead camera 220 or front facing camera 230. In one embodiment, individual light emitting diodes that make up the light emitting diode strip are separately operable such that the lower rail lighting 520 can be partially illuminated or entirely illuminated. Particularly, the lower rail lighting 520 may be used to provide an indication to the dealer as to which side of the table to deal a card or, if all of the necessary cards have been dealt, to indicate to not deal a card. Such indications can be provided by using the multi-colored light function of the lower rail lighting 520 as well as the individual controllability of the individual lights.

In one embodiment, software associated with the gaming server 200 and the with the overhead and forward facing cameras 220, 230 may be trained regarding various games that can be played on the gaming table. Thereby, when card data for cards displayed on the gaming table 180, stored by the gaming server 200, and confirmed by the overhead camera 220, the software may be used to control the lower rail lighting 510 to, for example, indicate that the dealer should deal a card to the left side, for example, the banker side for a game of baccarat, or to the right side, or player side for a game of baccarat. The lower rail lighting 510 could also, for example, be illuminated in red to indicate to a dealer that no more cards need to be dealt for the present hand.

It should be understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A gaming table system comprising:

a gaming table having a table top having at least one table top opening;

at least one light emitting device located within the table top opening;

a light geometry plate corresponding to the at least one light emitting device, wherein the light geometry plate has a light geometry plate opening to dictate a shape of light projected through the light geometry plate opening;

a table top foam on the gaming table, the table top foam comprising at least one table top foam opening substantially aligned with the at least one table top opening, wherein the at least one table top foam opening is larger than the at least one table top opening such that the table top creates a ledge;

a transparent material located within the at least one table top foam opening and supported on the ledge of the gaming table, the transparent material covering the at least one light emitting device and the light geometry plate; and a top surface material covering the table top opening and the light geometry plate, wherein light from the light emitting device can be projected on the top surface material in shape dictated by the light geometry plate.

2. The gaming table system of claim 1, wherein the light geometry plate opening has an L-shape.

3. The gaming table system of claim 1, f wherein the light geometry plate is accommodated by the table top foam opening.

4. A gaming table system comprising:

a gaming table having a table top having at least one table top opening;

at least one light emitting device located within the table top opening;

a light geometry plate corresponding to the at least one light emitting device, wherein the light geometry plate has a light geometry plate opening to dictate a shape of light projected through the light geometry plate opening;

a transparent material covering the at least one light emitting device and the light geometry plate; and a top surface material covering the table top opening and the light geometry plate, wherein light from the light emitting device can be projected on the top surface material in shape dictated by the light geometry plate; and a rail extending around at least a partial perimeter of the gaming table and protruding above the table top, wherein the rail accommodates at least one of an upper rail lighting configured to illuminate a dealer located adjacent to the table and a lower rail lighting configured to provide dealing information to the dealer.

5. The gaming table system of claim 4, wherein the rail accommodates both of the upper rail lighting and the lower rail lighting.

6. The gaming table system of claim 4, wherein the upper rail lighting comprises a continuous strip of lighting.

7. The gaming table system of claim 4, wherein the lower rail lighting comprises multiple individually controllable light emitting devices.

8. The gaming table system of claim 1, further comprising an overhead camera system that is configured to capture footage of gaming activity at the gaming table, wherein the overhead camera system is configured to analyze whether cards on the gaming table are in a correct location and orientation.

9. The gaming table system of claim 8, further comprising a card shoe, wherein the card shoe comprises a detector to determine card information of a card extracted from the card shoe and communicate the card information to the overhead camera system.

10. The gaming table system of claim 1, wherein the top surface material is substantially opaque, but wherein light from the visual indicator projected onto a first side of the top surface material is visible on a second opposite side of the top surface material.

11. A gaming table system comprising:

a gaming table having a table top surface on which a card game can be played;

a visual indicator providing a visual guide as to where a playing card should be placed, the visual indicator comprising a light emitting device and configured to display a light-based shape on the table top surface when the light emitted device emits light;

a camera configured to capture footage of the table top surface;

software associated with a database server, the software being configured to compare the footage captured by the camera with card data stored in the database server; and a dealer display device in communication with the camera and configured to provide an indication when the playing card is placed on the gaming table in a wrong location, a wrong orientation, or is not a correct rank and/or suit based on the comparison between the footage and the card data.

12. The gaming table system of claim 11, wherein the visual indicator is covered by the table top surface such that the light-based shape is projected onto the table top surface from a side opposite to a surface on which the card game can be played.

13. The gaming table system of claim 11, wherein the light-based shape is projected onto the table top surface from below the table top surface.

14. The gaming table system of claim 11, wherein the visual indicator is covered by the table top surface such that the visual indicator is not visible through the table top surface.

15. The gaming table system of claim 11, wherein the visual indicator further comprises a light geometry plate configured to dictate a shape of the light-based shape projected onto the table top surface.

16. The gaming table system of claim 11, further comprising a card shoe configured to identify card data of a card dealt from the card shoe, wherein the camera is configured to capture footage of the card dealt from the card shoe.

17. The gaming table system of claim 16, wherein the camera is configured to compare card data from the card shoe to footage of the card dealt and communicate comparison data with the dealer display device.

18. The gaming table system of claim 16, wherein the card data comprises at least one of a card location, a card orientation, a card suit, and a card rank.

19. A gaming table system comprising:

a gaming table having a table top surface on which a card game can be played;

a visual indicator providing a visual guide as to where a playing card should be placed, the visual indicator comprising a light emitting device and configured to display a light-based shape on the table top surface when the light emitted device emits light;

a camera configured to capture footage of the table top surface;

a dealer display device in communication with the camera and configured to provide an indication when the playing card is placed in a correct location; and a rail extending around at least a partial perimeter of the gaming table and protruding above the table top, wherein the rail accommodates at least one of an upper rail lighting configured to illuminate a dealer located adjacent to the table and a lower rail lighting configured to provide dealing information to the dealer.

20. The gaming table system of claim 19, wherein the rail accommodates both of the upper rail lighting and the lower rail lighting.

* * * * *